United States Patent [19]

Ezawa

[11] Patent Number: 5,172,148
[45] Date of Patent: Dec. 15, 1992

[54] FILM WINDING APPARATUS WITH VARIABLE RATIO OF FILM SPEED AND WINDING SPOOL SPEED

[75] Inventor: Akira Ezawa, Tokyo, Japan
[73] Assignee: Nikon Corporation, Tokyo, Japan
[21] Appl. No.: 724,171
[22] Filed: Jul. 1, 1991
[30] Foreign Application Priority Data
Jul. 6, 1990 [JP] Japan .................................. 2-179073
[51] Int. Cl.$^5$ .................................................. G03B 1/18
[52] U.S. Cl. .................................................... 354/173.1
[58] Field of Search ........................ 354/173.1, 173.11
[56] References Cited

U.S. PATENT DOCUMENTS

| | | | |
|---|---|---|---|
| 4,571,044 | 2/1986 | Wakabayashi | 354/173.11 |
| 4,572,635 | 2/1986 | Tsuzuki et al. | 354/173.1 |
| 4,647,169 | 3/1987 | Suzuki et al. | 354/173.1 |
| 4,734,732 | 3/1988 | Nishio et al. | 354/173.11 |
| 4,818,921 | 4/1989 | Hata et al. | 354/173.1 X |
| 4,832,275 | 5/1989 | Robertson | 242/71.1 |
| 4,834,306 | 5/1989 | Robertson et al. | 242/71.1 |
| 4,864,332 | 9/1989 | Harvey | 354/173.1 X |
| 4,878,077 | 10/1989 | Maeno et al. | 354/173.1 X |

Primary Examiner—Michael L. Gellner
Assistant Examiner—J. K. Han
Attorney, Agent, or Firm—Shapiro and Shapiro

[57] ABSTRACT

A film winding apparatus, using a film cartridge constructed so that film is fed from the cartridge by rotating a film cartridge spool, comprises a film cartridge spool drive unit for driving the film cartridge spool, a winding spool drive unit for driving a film winding spool, a film tip position detector for detecting that a tip of the film fed from the film cartridge has arrived at the winding spool, or a predetermined distance from the winding spool, and outputting a film tip position signal, and control device for receiving the film tip position signal. The control device controls the film cartridge spool drive unit and the winding spool drive unit so that after the control device receives the film tip position signal, a speed ratio VF/VS is provided in which the film feed speed VF is slower than the circumferential speed VS of the winding spool, and so that before the control device receives the film tip position signal, a larger speed ratio is provided.

7 Claims, 6 Drawing Sheets

FILM WINDING APPARATUS WITH VARIABLE RATIO OF FILM SPEED AND WINDING SPOOL SPEED

BACKGROUND OF THE INVENTION

1. Field of the Invention

This invention relates to a film winding apparatus for a camera using a film cartridge which has been so constructed that the film is sent outside from the cartridge by rotating the cartridge spool in the sending-out direction.

2. Related Background Art

Since the tip of this type of film is initially not exposed from the cartridge as disclosed by U.S. Pat. No. 4,832,275 and 4,834,306, for example, the film is sent outside from the cartridge by rotating the cartridge spool after loading the camera with a film cartridge.

The present inventor has proposed the following winding and rewinding apparatus for cameras using such a film cartridge.

The camera has a feeding mechanism for driving, by a motor, a cartridge spool, which sends out the film from the cartridge when winding the film and rewinds the film around the cartridge when rewinding, and a winding spool for winding the film. In order to securely wind the tip of the film sent out from the cartridge around the winding spool in rotation when loading the film, the film sending-out speed from the cartridge is slower than the circumferential speed of the winding spool.

The film is sent out from the cartridge at a speed slower than the circumferential speed of the winding spool, and the film tip is wound around the winding spool in rotation when the film tip reaches the winding spool. After the film tip is wound around the winding spool, the film is wound by the winding spool.

In such a film winding and rewinding apparatus, however, since the film feed speed is slower than the circumferential speed of the winding spool, during a period from the time the film starts being sent out until it is wound around the winding spool there is a problem in that it takes a rather long time to wind the film around the winding spool.

Also since the drive of the winding spool is started the moment the drive of the cartridge spool is started to send out the film, the rotation of this winding spool is idle rotation until the film tip reaches the winding spool. Therefore, there is a problem in that electric power to drive the winding spool is wastefully consumed.

SUMMARY OF THE INVENTION

It is the first object of the present invention to provide an apparatus capable of reducing a period from the time the film is sent out from the cartridge until it is wound around the winding spool.

It is the second object of the present invention to provide an apparatus capable of smoothly shifting from the film sending-out operation to the film winding operation by the winding spool and also not wastefully consuming electric power to drive the winding spool.

Referring to FIGS. 1 and 2 showing an embodiment, the present invention applies to a winding and rewinding apparatus for a camera to be loaded with a film cartridge 1 which has been so constructed that the film 2 is sent out from the cartridge 1 by rotating a cartridge spool 1a in the sending-out direction.

The above-mentioned first object can be accomplished by providing drive means 3, 6, 10 and 20, which drive a winding spool 4 for winding the film 2 sent out from a cartridge 1 and at the same time, a cartridge spool 1a, film tip position detecting means 7 for detecting that the tip of the film 2 sent out from the cartridge 1 has arrived at the winding spool or a predetermined distance from the winding spool 4, and control means 36 for controlling the cartridge spool 1a and the winding spool 4 through the drive means 3, 6, 10 and 20 so that a speed ratio VF/VS of a speed VF of the film 2 sent out from the cartridge 1 to a circumferential speed VS of the winding spool 4 is changed after detecting by the film tip position detecting means 7. A speed ratio is provided so that after the detection the feed speed of the film 2 is slower than the circumferential speed of the winding spool 4 and before the detection, a larger speed ratio than the above-mentioned speed ratio is provided.

The control means 36 switches the speed ratio VF/VS after the film tip position detecting means 7 detects that the tip of the film 2 has arrived at the winding spool 4 or the predetermined distance from the winding spool 4. That is, the cartridge spool 1a and the winding spool 4 are controlled through the drive means 3, 6, 10 and 20 so that such a speed ratio as to make the feed speed of the film 2 slower than the circumferential speed of the winding spool 4 is provided after the detection, and so that a speed ratio before the detection is made larger than the above-mentioned speed ratio.

The above-mentioned second object can be accomplished by providing cartridge spool drive means 3 and 10 for driving the cartridge spool 1a, winding spool drive means 6 and 20 for driving the winding spool 4 to wind the film 2 sent out from the cartridge 1, film tip position detecting means 7, which detects that the tip of the film 2 sent out from the cartridge 1 has arrived at the predetermined distance from the winding spool 4 and outputs a film tip position signal, and control means 36 which starts driving the winding spool drive means 6 and 20 after receiving the film tip position signal, and controls the cartridge spool 1a and the winding spool 4 through the cartridge spool drive means 3 and 10 and the winding spool drive means 6 and 20 so that the feed speed VF of the film 2 sent out from the cartridge 1 is made slower than the circumferential speed VS of the winding spool 4.

Since the control means 36 starts driving the winding spool drive means 6 and 20 after receiving the film tip position signal showing that the tip of the film 2 sent out from the cartridge 1 has arrived at the predetermined distance from the winding spool 4, the electric power is not wastefully consumed by idle rotation of the winding spool 4.

Although a diagram of an embodiment has been used to explain the configuration of the present invention in easier terms, the present invention is not limited to this embodiment.

DESCRIPTION OF THE PREFERRED EMBODIMENTS

Figure 1:
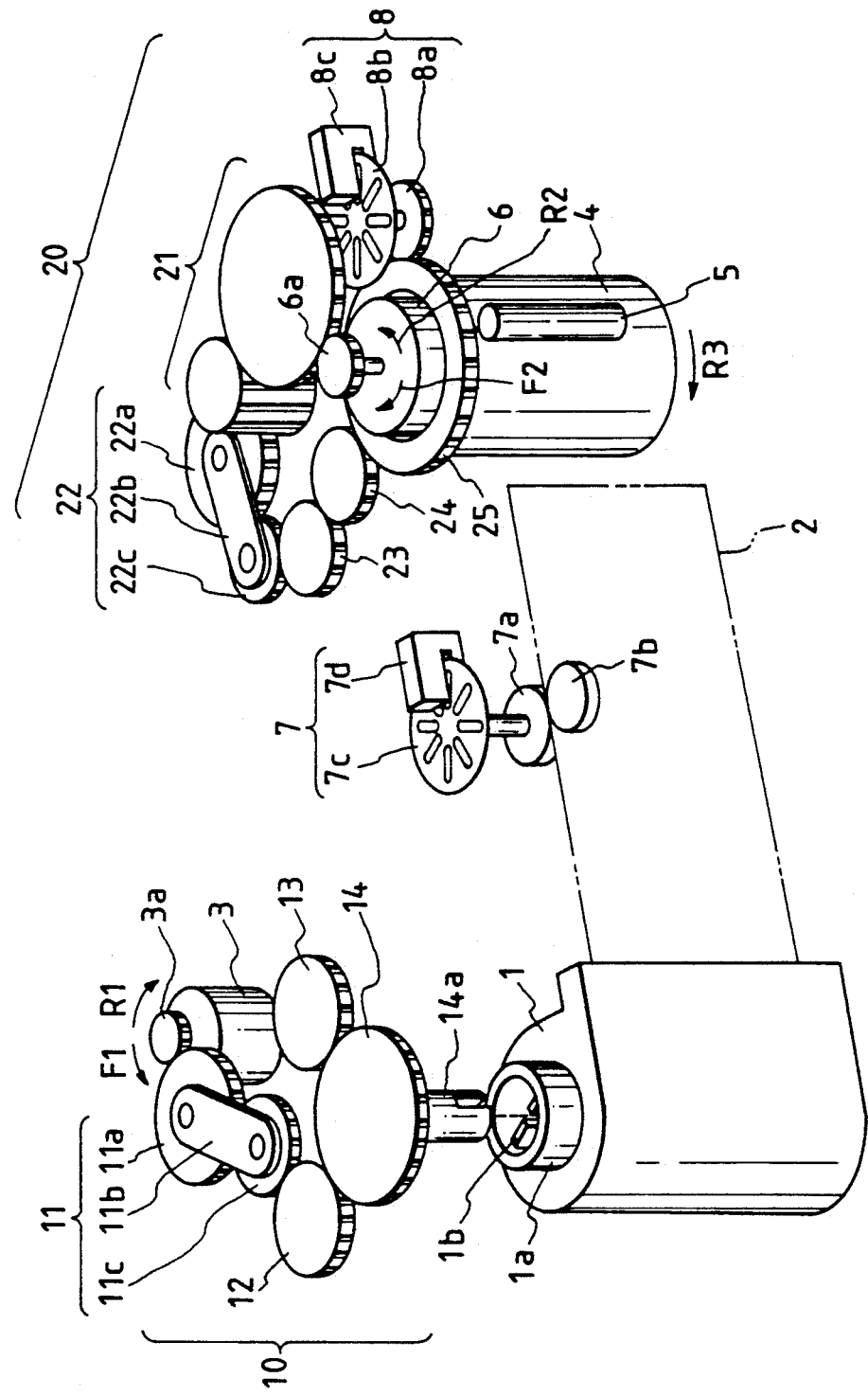
FIG. 1 is a perspective view showing details of an embodiment of a camera winding and rewinding mechanism according to the present invention.

FIG. 1 is a perspective view showing a camera winding and rewinding mechanism according to the present invention.

Figure 2:
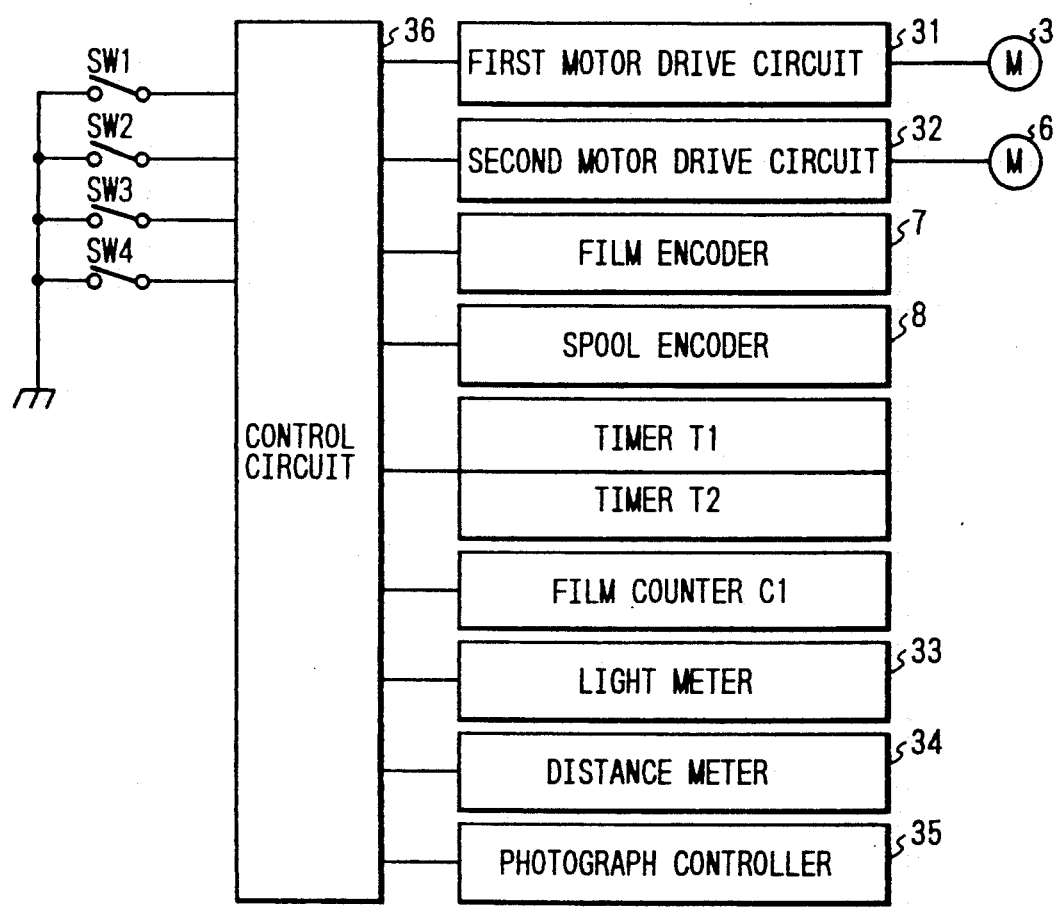
FIG. 2 is a block diagram showing the entire configuration of an embodiment according to the present invention.

FIG. 2 is a block diagram showing the entire configuration of an embodiment of the present invention.

The camera winding and rewinding mechanism will be described referring to FIG. 1.

Film 2 wound around a cartridge spool 1a is housed in a film cartridge 1. A first motor 3 drives a cartridge spool 1a through a first drive mechanism 10. The first drive mechanism 10 is composed of a gear 3a secured to the revolving shaft of the first motor 3, a planetary mechanism 11 consisting of a gear 11a, a planetary arm 11b and a planetary gear 11c, a gear 12 for meshing with the planetary gear 11c when sending out the film, a gear 13 for meshing with the planetary gear 11c when rewinding the film, a cartridge spool driving gear 14 and a fork 14a secured to the gear 14.

A winding spool 4 winds the film 2. A film pressing roller 5 is energized by a spring (not shown) to be pressed against the winding spool 4. When the film tip arrives at the winding spool 4, this film pressing roller 5 presses the tip of the film 2 against the winding spool 4 to wind the film 2 around the winding spool 4. Then the film 2 is wound by the rotation of the winding spool 4.

A second motor 6 drives the winding spool 4 through a second drive mechanism 20. The second drive mechanism 20 is composed of a gear 6a secured to the revolving shaft of the second motor 6, a gear train 21, a second planetary mechanism 22 consisting of a gear 22a, a planetary arm 22b and a planetary gear 22c, gears 23 and 24, and a spool gear 25 which rotates together with the winding spool 4 as one body.

Numeral 7 designates a photoelectric film encoder. When the film 2 passes between a detecting roller 7a and a pressing roller 7b, the detecting roller 7a rotates, causing a slit plate 7c mounted to the detecting roller 7a to rotate. The slit plate 7c intermittently covers the ray of light from a photoelectric converter 7d, with a unitary light projector/receiver in proportion to its rotary speed. The photoelectric converter 7d converts a light pulse signal generated by the rotation of the slit plate 7c into an electric signal for output. That is, the film encoder 7 detects that the tip of the film 2 has arrived at a predetermined distance from the winding spool 4 and also detects the sending-out speed of the film 2 when the tip of the film 2 is wound around the winding spool 4.

In a photoelectric spool encoder 8, when the winding spool 4 rotates, a gear 8a for meshing a spool gear 25 rotates, causing a slit plate 8b mounted to this gear 8a to rotate in the same manner as in the above-mentioned film encoder 7. The slit plate 8b intermittently covers the ray of light from a photoelectric converter 8c in proportion to its rotary speed with rotation. The photoelectric converter 8c converts a light pulse signal generated by the rotation of the slit plate 8b into an electric signal for output. That is, the spool encoder 8 detects the circumferential speed of the winding spool 4.

Now the operation of the winding and rewinding mechanism shown in FIG. 1 will be described.

When a camera is loaded with a film cartridge 1, a spline 1b in a cartridge spool 1a fits into the concave portion in a fork 14a. When sending out the film, the first motor 3 rotates in the F1 direction as shown in FIG. 1, that is, in the sending-out direction of the film 2, and the planetary arm 11b will rock clockwise as the gear 11a is driven clockwise, and the planetary gear 11c will mesh with a gear 12. The rotation of the first motor 3 is thus transferred in the order of the gear 3a→the gear 11a→the planetary gear 11c→the gear 12→ the gear 14, and the cartridge spool 1a is driven counterclockwise to send out the film 2 from the film cartridge 1.

When the film encoder 7 detects that the tip of the film 2 has passed the film encoder 7, the second motor 6 starts the rotation in the F2 direction as shown in FIG. 1, that is, in the film winding direction. The rotation of the second motor 6 is transmitted to a gear 22a through a gear 6a and a gear train 21. The gear 22a rotates counterclockwise, causing the planetary arm 22b to rock counterclockwise. As a result, the planetary gear 22c meshes with a gear 23. That is, the rotation of the second motor 6 is transmitted in the order of the gear 6a→ the gear train 21→ the gear 22a→the planetary gear 22c→the gear 23→ the gear 24→ the spool gear 25, and the winding spool 4 secured to the spool gear 25 rotates in the film winding direction.

A film pressing roller 5 presses the tip of the film 2 against the winding spool 4 to wind the film 2 around the winding spool 4. To securely wind the film 2 around the winding spool 4 at this time, the sending-out speed VF of the film 2 is controlled by a control circuit as mentioned later to be slightly slower than the circumferential speed VS of the winding spool 4.

The film 2 housed in the film cartridge 1 before starting sending out the film is sent out while expanding within the cartridge 1 when the cartridge spool 1a is driven by the first motor 3 to rotate in the film sending-out direction. When, however, the winding spool 4 starts winding the film 2, the film 2 is drawn out faster from the film cartridge 1 than the sending-out speed because the circumferential speed VS of the winding spool 4 is faster than the film sending-out speed VF. As a result, the film 2 is gradually tightly wound around the cartridge spool 1a within the cartridge 1, and finally completely tightly wound around the cartridge spool 1a.

Thereafter, the cartridge spool 1a is not driven by the first motor 3, but is rotated by the film 2 being drawn out, and its rotary speed becomes faster than the sending-out speed at the beginning into a speed corresponding to the circumferential speed of the winding spool 4. Since speeds of the gears 14 and 12, which interlock the cartridge spool 1a, are also increased at this time, the planetary arm 11b rocks in such a direction that the planetary gear 11c goes away from the gear 12 due to the property of a planetary gear.

That is, since the planetary gear 11c is disengaged from the gear 12, a speed difference between the rotary speed of the gear 11a driven by the first motor 3 and that of the gear 12 driven by film winding of the winding spool 4 can be settled.

To rewind the film, the first motor 3 rotates in the R1 direction as shown in FIG. 1, that is, in the rewinding direction, and the gear 11a will be driven counterclockwise, the planetary arm 11b will also rock counterclockwise, and the planetary gear 11c will mesh with the gear 13.

The rotation of the first motor 3 is thus transmitted in the order of the gear 3a→the gear 11a→the planetary gear 11c→the gear 13→the gear 14, and the cartridge spool 1a is driven clockwise to rewind the film 2 around the film cartridge 1.

Before starting film rewinding, however, the planetary gear 22c of the second drive mechanism 20 remains meshing the gear 23, and this mesh is not disengaged even if the winding spool 4 starts rotating in the R3 direction as shown in FIG. 1 with rewinding of the film 2. As a result, the rotation of the winding spool 4 is transmitted to the second motor 6 through the second drive mechanism 20, and the second motor 6 will be a great load to the first motor 3 when rewinding the film.

To avoid such a defect, the second motor 6 is started in the R2 direction as shown in FIG. 1 for a specified time through a control circuit as mentioned later before rewinding the film, to disengage the planetary gear 22c from the gear 23 by rocking the planetary arm 22b clockwise.

The entire configuration of a camera winding and rewinding apparatus according to the present invention will be described referring to FIG. 2. The same component equipment as the mechanism shown in FIG. 1 will be designated by the same symbols to limit the description.

A drive circuit 31 drives the first motor 3, and a drive circuit 32 drives the second motor 6. Numerals T1 and T2 are timers, and a film counter C1 counts a number of exposures in winding the film. A light meter 33 meters the light in a photograph picture and outputs the brightness information. A distance meter 34 detects a state of focusing of a photograph optical system (not shown) and outputs the focus detection information. A photograph controller 35 controls a shutter mechanism and a diaphragm mechanism. A switch SW1 detects a state of opening or closing of the camera back, and turns on when the camera back is closed. A cartridge detection switch SW2 turns on when a camera is loaded with the film cartridge 1.

A shutter release button lightly pressing switch SW3 turns on when the shutter release button is lightly pressed. A shutter release button fully pressing switch SW4 turns on when the shutter release button is fully pressed.

A control circuit 36 consists of a microcomputer and its peripheral parts, and executes a film winding and rewinding control program as mentioned later to wind and rewind the film 2.

Figure 3:
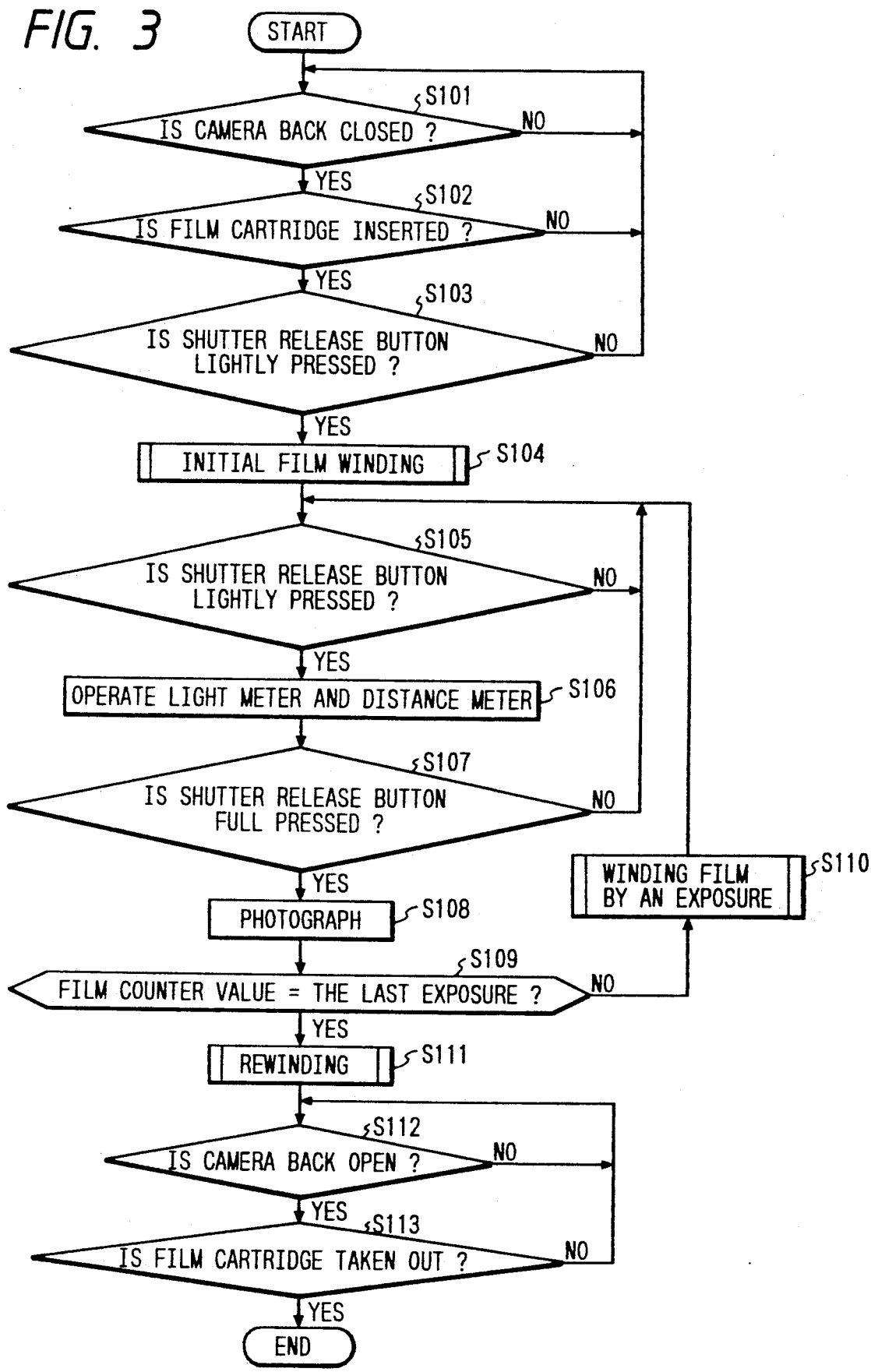
FIG. 3 is a flow chart showing a film winding and rewinding control program.

FIG. 3 shows a film winding and rewinding control program to be executed by the control circuit 36. The winding and rewinding operations of the film 2 will be described referring to FIG. 3.

In step S101, distinguish through a camera back switch SW1 whether or not the camera back has been closed. Repeat the step S101 until the camera back is closed, and when it is closed, proceed to step S102. Distinguish through a cartridge switch SW2 whether or not the camera has been loaded with the film cartridge 1. If the camera has been loaded with the film cartridge 1, proceed to step S103, and if not, return to step S101. Distinguish through the shutter release button lightly pressing switch SW3 in step S103 whether or not the shutter release button has been lightly pressed, and if it has been pressed, proceed to step S104. If not, return to step S101.

Figure 4:
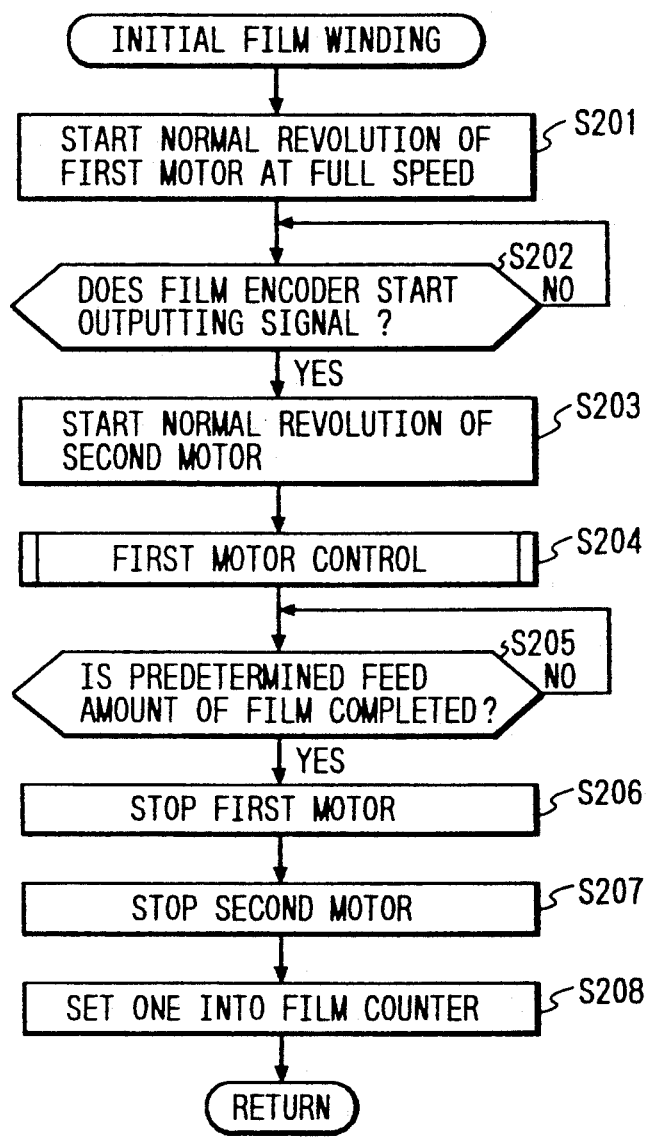
FIG. 4 is a flow chart showing the initial winding subroutine.

In step S104, execute an initial film winding subroutine shown in FIG. 4 to send out the film 2 from the loaded film cartridge 1, and wind the film 2 around the winding spool 4 to wind the first exposure to a predetermined photograph position.

In step S201 in FIG 4, start normal rotation of the first motor 3 at full speed through the first motor drive circuit 31, that is, in the film sending-out direction F1. In the consecutive step S202, distinguish whether or not output of a pulse signal has been started from the film encoder 7, that is, whether or not the tip of the film 2 has arrived at the encoder 7, and repeat the step S202 until the output of the signal is started. When the tip of the film 2 has arrived at the encoder 7, proceed to step S203, and start normal rotation of the second motor 6 through the second motor drive circuit 32, that is, in the film winding direction F2.

Figure 5:
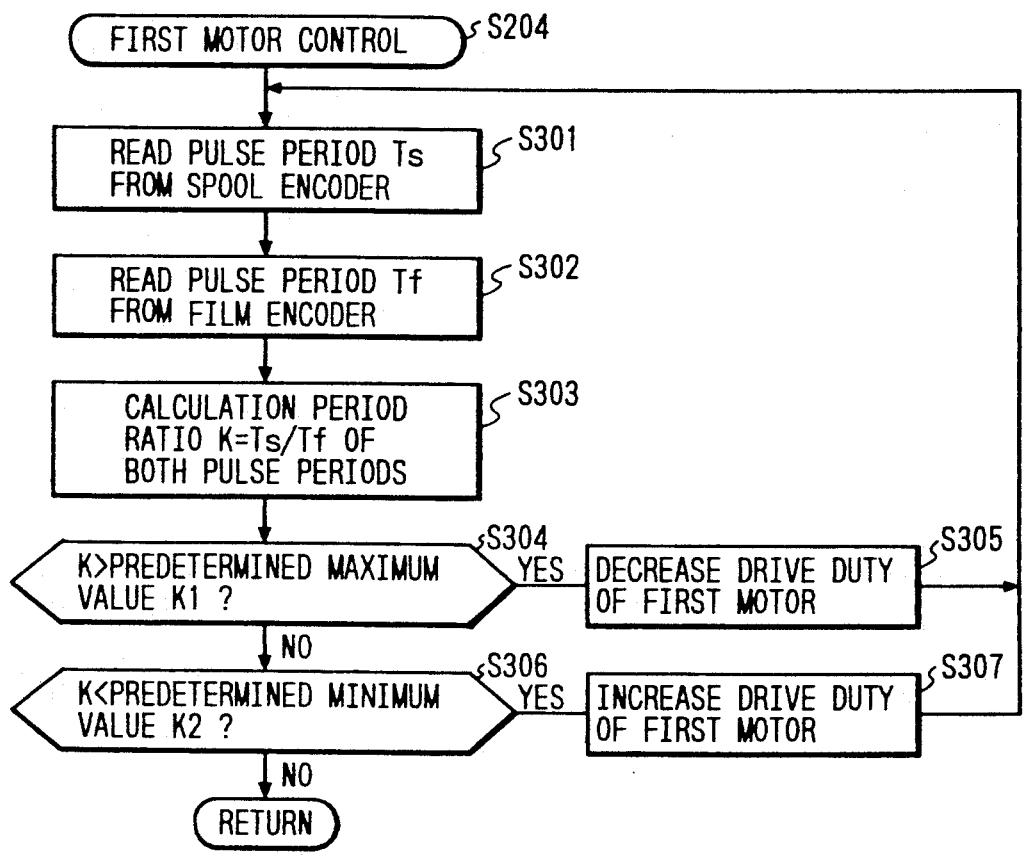
FIG. 5 is a flow chart showing a first motor control subroutine.

In step S204, execute the first motor control subroutine shown in FIG. 5. When this subroutine has been executed, the speed ratio VF/VS of the film sending-out speed VF to the circumferential speed VS of the winding spool 4 is switched before or after it is detected by the film encoder 7 that the tip of the film 2 has arrived at the predetermined distance from the winding spool 4. That is, such a speed ratio VF/VS is applied that the film sending-out speed VF is slower than the circumferential speed VS of the winding spool 4 after the detection, and before the detection, a larger speed ratio is applied than the above-mentioned speed ratio VF/VS.

In this embodiment, the first and second motors 3 and 6 are controlled through the first and second motor drive circuits 31 and 32, and the first motor 3 is driven at full speed, and the second motor 6 is stopped as mentioned above before the detection. After the detection, the drive speed of the first motor 3 is controlled by using the following procedure so that the film sending-out speed is slower than the circumferential speed of the winding spool 4.

In FIG. 5, first read a period Ts of a pulse signal from the spool encoder 8 in step S301, and read a period Tf of a pulse signal from the film encoder 7 in the consecutive step S302. Then in step S303, calculate the period ratio $K = Ts/Tf$ of both pulse periods detected in the above-mentioned step.

The frequency $Ff (=1/Tf)$ of a pulse signal from the film encoder 7 is proportionate to the film sending-out speed VF, and on the other hand, the frequency Fs $(=1/Ts)$ of a pulse signal from the spool encoder 8 is proportionate to the circumferential speed VS of the winding spool 4. Also since the above-mentioned speed ratio VF/VS is equal to the frequency ratio (Ff/Fs) of pulse signals from both encoders 7 and 8, $$(VF/VS) = (Ff/Fs) = (1/Tf)/(1/Ts) = (Ts/Tf) = K.$$

That is, since the above-mentioned speed ratio (VF/VS) is equal to a period ratio K to be calculated in step S303, a desired speed ratio VF/VS can be obtained by controlling the drive speed of the first motor 3 so that this period ratio K becomes constant.

In step S304, distinguish whether or not the pulse period ratio K is larger than a predetermined maximum value K1, and if $K > K1$, proceed to step S305. If not, proceed to step S306. In step S305, $K (=VF/VS) > K1$, that is, the film sending-out speed VF is too high for the circumferential speed VS of the winding spool 4. Therefore, drive the first motor 3 at a well known duty, and reduce the duty ratio to lower the film sending-out speed VF. Thereafter, return to the step S301 again.

In step S306, distinguish whether or not the pulse period ratio K is smaller than a predetermined minimum value K2, and if K<K2, proceed to step S307, and if not, return to the initial film winding subroutine shown in FIG. 4. Since K (=VF/VS)<K2, that is, the film sending-out speed VF is too low for the circumferential speed VS of the winding spool 4 in step S307, increase the film sending-out speed VF by increasing the duty ratio of the first motor 3. Thereafter, return to the step S301 again.

After the tip of the film 2 has arrived at the film encoder 7 in this way, control so that the pulse period ratio K of both encoders 7 and 8 is in a predetermined range K1>K>K2. This causes the film sending-out speed VF to be slightly slower than the circumferential speed VS of the winding spool 4.

Return to the initial film winding subroutine in FIG. 4 again, and distinguish in step S205 whether or not a predetermined length of the film 2 has been fed, that is, whether or not the first exposure of the film 2 has been set at a predetermined photograph position. Repeat the step S205 until the predetermined length is fed. This predetermined length of film feed is detected by counting the number of pulses of pulse signal from the film encoder 7 or the number of pulses of pulse signal from the spool encoder 8.

When a predetermined length of the film 2 has been fed in step S205, stop the first motor 3 in step S206, and stop the second motor 6 in the consecutive step S207. Further set a film counter C1 to "1" in step S208, and then return to a program shown in FIG. 3.

In step S105 in FIG. 3, distinguish through the shutter release button lightly pressing switch SW3 whether or not the shutter release button has been lightly pressed, and repeat the same step until it is pressed. When the shutter release button has been lightly pressed, proceed to step S106, and meter the light in the photograph picture through a light meter 33. At the same time, detect a state of focusing of a photograph optical system through a distance meter 34, and drive the photograph optical system on the basis of this focus detection information for focusing. Then in step S107 distinguish through a shutter release button fully pressing switch SW4 whether or not the shutter release button has been fully pressed, and if it has been pressed, proceed to step S108. If not, return to step S105.

In step S108, drive a shutter mechanism and a diaphragm mechanism on the basis of the brightness information detected in the above-mentioned step through a photograph controller 35 for exposure. When photographing has been completed, distinguish in step S109 whether or not the value of the film counter C1 is the last exposure, and if it is the last exposure, proceed to a step S111. If not, proceed to step S110.

Figure 6:
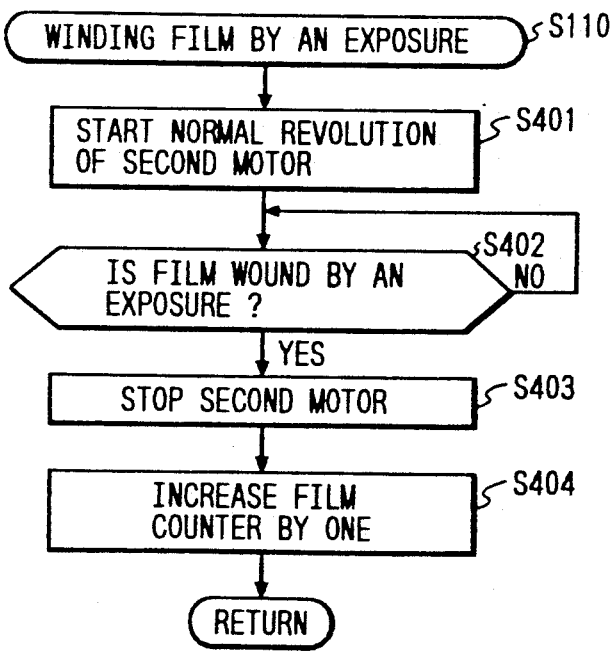
FIG. 6 is a flow chart showing a subroutine for winding film by an exposure.

In step S110, execute the subroutine for winding film by an exposure shown in FIG. 6.

In step S401 in FIG. 6, start normal rotation of the second motor 6 through the second motor drive circuit 32, that is, in the winding direction F2. In the consecutive step S402, distinguish whether or not the film 2 has been wound by an exposure, and repeat the same step until it is wound by an exposure. The amount of feed of the film 2 by an exposure is detected by counting the number of pulses of pulse signal from the film encoder 7 or the spool encoder 8. When the film has been wound by an exposure, proceed to step S403 to stop the second motor 6, and return to the program shown in FIG. 3 after increasing the film counter C1 in the consecutive step S404. After returning, return to the step S105 again.

Figure 7:
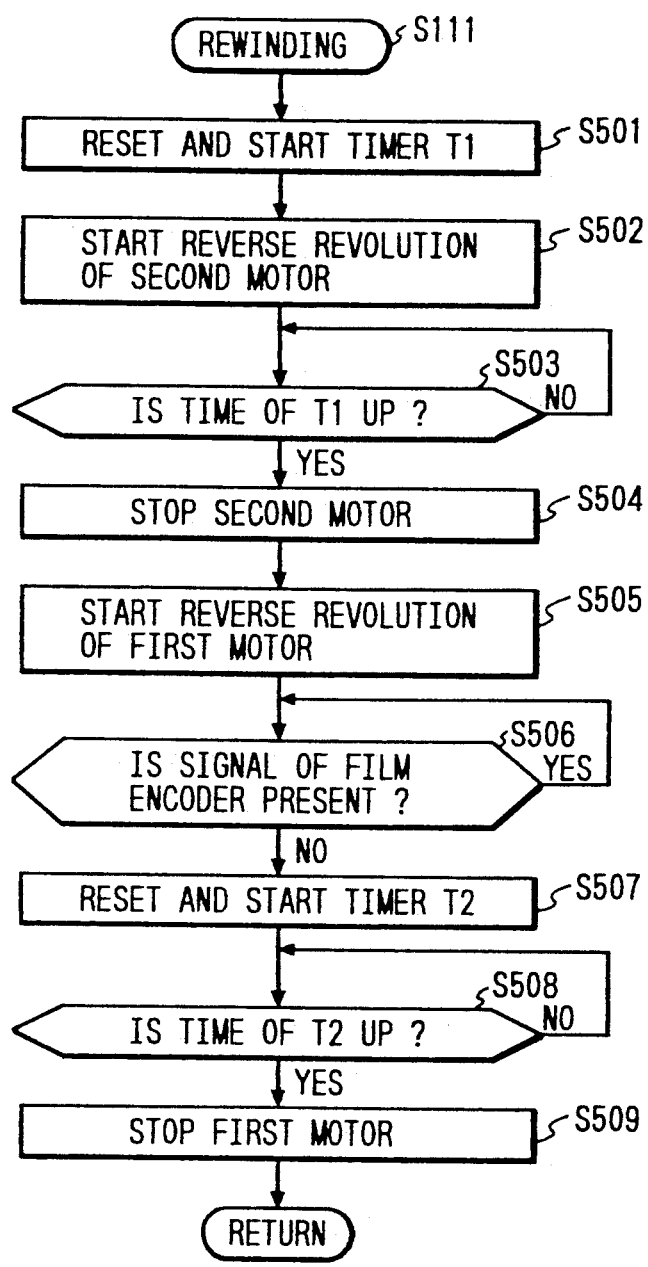
FIG. 7 is a flow chart showing a rewinding subroutine.

After photographing has been completed to the last exposure of the film, execute the rewinding subroutine shown in FIG. 7 in step S111 to rewind the film 2 around the film cartridge 1.

In step S501 in FIG. 7, reset and start a timer T1. Then reverse the second motor 6 in step S502, and distinguish in step S503 whether or not time of the timer T1 is up, and repeat the same step until the time is up. After time up of the timer T1, stop the second motor 6 in step S504. The processes in these steps S501 to S504 are performed to disengage the mesh between the planetary gear 22c and the gear 23 in the second drive mechanism 20, which remain meshing with each other when winding the film, by reversing the second motor 6 for a specified time as mentioned above.

In step S505, start rewinding the film 2 by reversing the first motor 3, that is, by starting in the film rewinding direction R1. Distinguish in the consecutive step S506 whether or not there is a pulse signal from the film encoder 7, that is, whether or not the tip of the film 2 has been rewound to the position of the film encoder 7, and repeat the same step until any pulse signal does not exist any longer.

After no pulse signal exists any longer, proceed to step S507 to reset and start the timer T2, and then distinguish in step S508 whether or not time of the timer T2 is up, and repeat the same step until the time is up. After time up of the timer T2, proceed to step S509 to stop the first motor 3. This timer T2 counts a period from the time the tip of the film 2 passes the film encoder 7 until the film 2 is completely rewound into the cartridge 1. After these processes are finished, return to the program shown in FIG. 3.

In step S112 in FIG. 3, distinguish through the switch SW1 whether or not the camera back has been opened, and repeat the same step until it is opened. After the camera back is opened, proceed to step S113, and distinguish through the swtitch SW2 whether or not the photographed film cartridge 1 has been taken out, and repeat the same step until it is taken out. When the photographed film cartridge 1 has been taken out from the camera, execution of the program is completed.

As described above, during initial winding of the film 2, detect by the presence of a pulse signal from the film encoder 7 that the tip of the film 2 has arrived at a predetermined distance from the winding spool 4 after starting sending-out of the film 2 from the cartridge 1 by driving the first motor 3 at full speed. When the tip has arrived at the film encoder 7, the second motor 6 is started, and the drive speed of the first motor 3 is controlled so that the film sending-out speed VF is slower than the circumferential speed VS of the winding spool 4. Accordingly, the film 2 can be securely wound around the spool 4 when the tip has arrived at the winding spool 4.

In the above embodiment, the drive speed of the first motor 3 was controlled so that the sending-out speed of the film 2 is slower than the circumferential speed of the winding spool 4 after the tip of the film 2 has passed the film encoder 7. However, the drive speed of the second motor 6 may be controlled or the drive speeds of both motors 3 and 6 may be controlled.

Further, in the above-mentioned embodiment, the second motor 6 was started after the tip of the film 2 had passed the film encoder 7. However, the first motor 3 may be started the moment the film sending-out is started.

By driving the second motor 6 after the film tip has passed the film encoder 7 like the above-mentioned embodiment, it is possible to smoothly shift to winding the film by the winding spool 4 the moment the film tip arrives at the winding spool 4, and to reduce the wasteful electric power consumption by the second motor 6. However, to shorten a period from the time the film is sent out from the cartridge 1 until the film is wound around the winding spool 4, the second motor 6 may be started after detecting that the film tip has arrived at zero distance from the winding spool 4, that is, the spool 4.

In the above-mentioned embodiment, a closed loop control has been performed by comparing the pulse periods of output pulse signal between the film encoder 7 and the spool encoder 8. However, after the tip of the film 2 has passed the film encoder 7, only the first motor 3, or only the second motor 6, or both motors 3 and 6 may be duty driven at a predetermined duty ratio to control the speed ratio by the open loop control.

Further in the above-mentioned embodiment, the film was wound and rewound by two motors: the first motor 3 for driving the cartridge spool 1a to send out the film 2, and the second motor 6 for driving the winding spool 4. However, a drive mechanism in which both spools 1a and 4 are driven by one motor, may be provided with such a speed ratio switching mechanism as to make the film feed speed slower than the circumferential speed of the winding spool only when winding the tip of the film 2 around the winding spool 4.

Also in the above-mentioned embodiment, it was directly detected by the film encoder 7 that the tip of the film 2 has arrived at a predetermined distance from the winding spool 4. However, it is also possible to set a timer to a period from the time the first motor 3 is started to start sending-out of the film 2 until the tip of the film 2 arrives at a predetermined distance from the winding spool 4, and to switch the speed ratio when the time of the timer is up.

In the configuration of the above embodiments, the drive means consists of the first motor 3, the second drive mechanism 20. The film tip position detecting means consists of the film encoder 7, and the control means consists of the control circuit 36.

According to the present invention as described above, when it is detected that the film tip has arrived at a predetermined distance from the winding spool, the speed ratio of the film feed speed to the circumferential speed of the winding spool is switched. Such a speed ratio as to make the film feed speed slower than the circumferential speed of the winding spool is provided after the detection, and before the detection, the cartridge spool or both the cartridge spool and the winding spool are driven at a larger speed ratio than the above-mentioned speed ratio. Therefore, the time required for the film to arrive at the winding spool becomes shorter, and the film tip can be securely wound around the winding spool after it has arrived at the winding spool.

Also when the tip of the film 2 sent out from the cartridge 1 has arrived at a predetermined distance from the winding spool 4, the drive of the winding spool is started. Therefore, during a period from the time the cartridge spool is driven until the tip of the film 2 arrives at a predetermined distance from the winding spool 4, the winding spool 4 is not idled, to consume electric power, but it is possible to smoothly shift from the film sending-out operation to the film winding operation by the winding spool.

I claim:

1. A film winding apparatus for a camera for use with a film cartridge constructed so that film is fed from the film cartridge by rotating a film cartridge spool, the film winding apparatus comprising:
   film cartridge spool drive means for driving said film cartridge spool to feed film from said film cartridge;
   winding spool drive means for driving a winding spool which winds the film fed from said film cartridge;
   film tip position detecting means, which detects that the tip of the film fed from said film cartridge has arrived at said winding spool or a predetermined distance from said winding spool, and outputs a film tip position signal;
   film speed detecting means for detecting the feed speed VF of the film fed from said film cartridge;
   spool speed detecting means for detecting the circumferential speed VS of said winding spool;
   calculating means for calculating a speed ratio VF/VS of the feed VF of the film detected by said film speed detecting means to the circumferential speed VS of the windng spool detected by said spool speed detecting means;
   speed ratio switching means for setting such a speed ratio that said film speed VF is slower than the circumferential speed VS of said winding spool after said film tip position signal is output, and setting a larger speed ratio than the set speed ratio before said film tip position signal is output; and
   control means for controlling said film cartridge spool drive means and said winding spools drive means so that the speed ratio calculated by said calculating means is the speed ratio set by said speed ratio switching means.

2. A film winding apparatus for a camera for use with a film cartridge constructed so that film is fed from the film cartridge by rotating a film cartridge spool, the film winding apparatus comprising:
   film cartridge spool drive means for driving said film cartridge spool to feed film from said film cartridge;
   winding spool drive means for driving a winding spool which winds the film fed from said film cartridge;
   film tip position detecting means, which detects that the tip of the film fed from said film cartridge has arrived at a predetermined distance from said winding spool, and outputs a film tip position signal;
   film speed detecting means for detecting the feed speed VF of the film fed from said film cartridge;
   spool speed detecting means for detecting the circumferential speed VS of said winding spool;
   calculating means for calculating a speed ratio VF/VS of the feed speed VF of the film detected by said film speed detecting means to the circumferential speed VS of the winding spool detected by said spool speed detecting means; and
   control means, which starts the drive of said winding spool drive means after receiving said film tip position signal, and controls said film cartridge spool drive means and said winding spool drive means so that the speed ratio calculated by said calculating means is such a speed ratio that said film feed speed VF is slower than the circumferential speed VS of said winding spool.

3. A film winding apparatus for a camera for use with a film cartridge constructed so that film is fed from the film cartridge by rotating a film cartridge spool, the film winding apparatus comprising:

film cartridge spool drive means for driving said film cartridge spool to feed film from said film cartridge;

winding spool drive means for driving a winding spool which winds the film fed from said film cartridge; and control means controlling the speed VF at which the film is fed from said film cartridge relative to the circumferential speed VS of said winding spool so that when a tip of the film fed from said film cartridge arrives at said winding spool or a predetermined distance from said winding spool, a speed ratio VF/VS is set in which VF is less than VS, and so that prior to the time that said film tip reaches said winding spool or said predetermined distance from said winding spool, a speed ratio is provided that is larger than said set speed ratio.

4. A film winding apparatus according to claim 3, further comprising film tip position detecting means which detects that a tip of the film fed from said film cartridge has arrived at said winding spool or said predetermined distance from said winding spool and outputs a film tip position signal, and wherein said control means is responsive to said film tip position signal for controlling said speed ratio.

5. A film winding apparatus for a camera for use with a film cartridge constructed so that film is fed from the film cartridge by rotating a film cartridge spool, the film winding apparatus comprising:

film cartridge spool drive means for driving said film cartridge spool to feed film from said film cartridge;

winding spool drive means for driving a winding spool which winds the film fed from said film cartridge; and control means which starts the driving of said winding spool drive means a period of time after the start of driving of said film cartridge spool drive means and before said film reaches said winding spool.

6. A film winding apparatus according to claim 5, further comprising film tip position detecting means which detects that a tip of the film fed from said film cartridge has arrived at a predetermined distance from said winding spool and outputs a film tip position signal, and wherein said control means starts the driving of said winding spool drive means in response to said film tip position signal.

7. A film winding apparatus according to claim 5, wherein said control means controls the speed at which said film is fed from said film cartridge relative to the circumferential speed of said winding spool so that the feed speed of said film is slower than the circumferential speed of said winding spool when said film reaches said winding spool.

* * * * *